(12) United States Patent
Stavo

(10) Patent No.: US 12,241,320 B2
(45) Date of Patent: Mar. 4, 2025

(54) SYSTEMS AND METHODS FOR PREVENTING CORROSION OF DRILL EQUIPMENT DUE TO DRILLING FLUID

(71) Applicant: TRANSOCEAN SERVICES AS, Rogaland (NO)

(72) Inventor: Ove Stavo, Houston, TX (US)

(73) Assignee: Transocean Sedco Forex Ventures Limited, Hamilton (BM)

( * ) Notice: Subject to any disclaimer, the term of this patent is extended or adjusted under 35 U.S.C. 154(b) by 0 days.

(21) Appl. No.: 18/031,709

(22) PCT Filed: Oct. 13, 2021

(86) PCT No.: PCT/EP2021/078356
§ 371 (c)(1),
(2) Date: Apr. 13, 2023

(87) PCT Pub. No.: WO2022/079120
PCT Pub. Date: Apr. 21, 2022

(65) Prior Publication Data
US 2023/0392459 A1    Dec. 7, 2023

Related U.S. Application Data

(60) Provisional application No. 63/090,978, filed on Oct. 13, 2020.

(51) Int. Cl.
*E21B 21/06* (2006.01)
*B01D 19/00* (2006.01)
*E21B 41/02* (2006.01)

(52) U.S. Cl.
CPC ........ *E21B 21/067* (2013.01); *B01D 19/0005* (2013.01); *B01D 19/0042* (2013.01); *B01D 19/0063* (2013.01); *E21B 41/02* (2013.01)

(58) Field of Classification Search
CPC .. B01D 2221/04; E21B 21/067; E21B 21/062
See application file for complete search history.

(56) References Cited

U.S. PATENT DOCUMENTS

| | | |
|---|---|---|
| 3,301,323 A | 1/1967 | Parsons |
| 4,136,747 A | 1/1979 | Mallory et al. |
| 4,350,505 A | 9/1982 | Mallory et al. |

(Continued)

OTHER PUBLICATIONS

International Search Report and Written Opinion mailed Mar. 10, 2022 in International Application No. PCT/EP2021/078356.

*Primary Examiner* — Zakiya W Bates
(74) *Attorney, Agent, or Firm* — Panitch Schwarze Belisario & Nadel LLP

(57) ABSTRACT

A method of removing oxygen from a drilling fluid includes pumping the drilling fluid into a first inlet of a mixer, such that the drilling fluid is flowing in a first direction. Further the method includes pumping a gas including nitrogen into a second inlet of the mixer to mix the gas with the drilling fluid, the second inlet being downstream of the drilling fluid. The method includes flowing the gas in an opposite direction from the first direction, thereby permitting mass transfer of the oxygen from the drilling fluid to the gas to produce a deoxygenated drilling fluid; and discharging the deoxygenated drilling fluid from an outlet of the mixer.

27 Claims, 15 Drawing Sheets

(56) References Cited

U.S. PATENT DOCUMENTS

| | | | |
|---|---|---|---|
| 4,416,672 A | * 11/1983 | Underwood | ....... B01D 19/0052 |
| | | | 55/435 |
| 4,609,385 A | 9/1986 | Burgess | |
| 5,112,357 A | 5/1992 | Bjerklund et al. | |

* cited by examiner

TOP VIEW
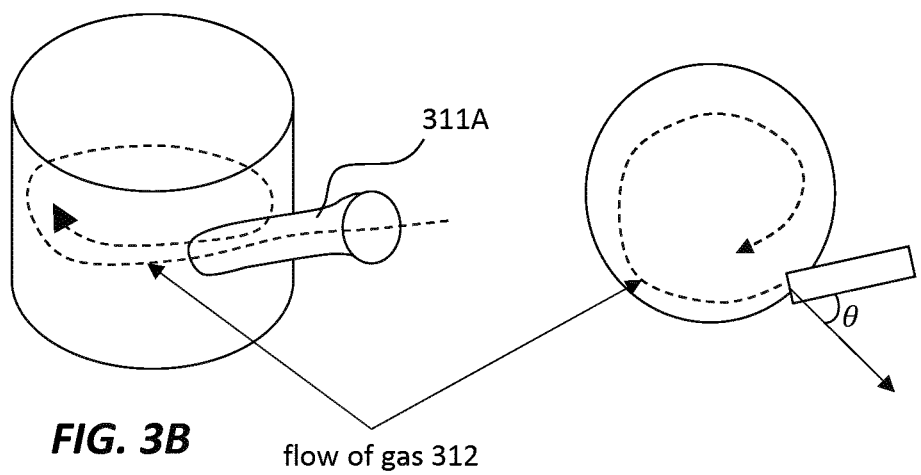
FIG. 3B  flow of gas 312
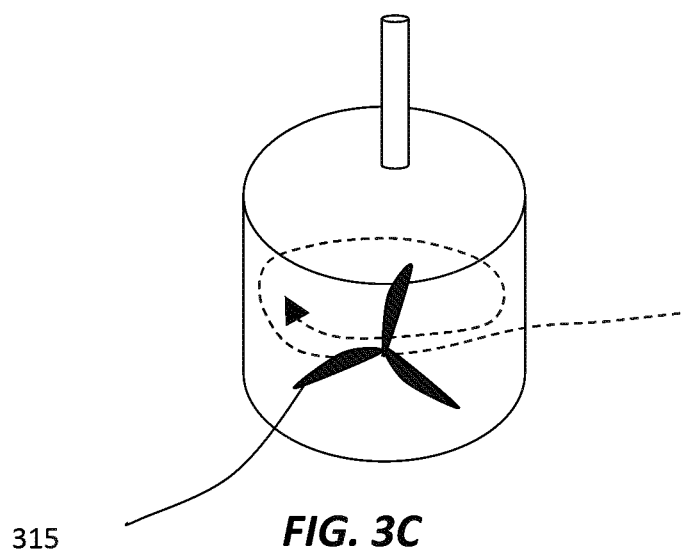
315  FIG. 3C

Table 1

| Test # | Nitrogen purity [%] | Gas flow rate [Nm³/h] | Drilling fluid flow rate [m³/h] | Packing height [mm] |
|---|---|---|---|---|
| 1 | 99.99 | 1.00 | 0.50 | 1890 |
| 2 | 99.99 | 1.60 | 0.50 | 1890 |
| 3 | 99.99 | 2.25 | 0.50 | 1890 |
| 4 | 99.99 | 1.00 | 0.70 | 1890 |
| 5 | 99.99 | 1.60 | 0.70 | 1890 |
| 6 | 99.99 | 2.25 | 0.70 | 1890 |
| 7 | 99.99 | 1.00 | 1.00 | 1890 |
| 8 | 99.99 | 1.60 | 1.00 | 1890 |
| 9 | 99.99 | 2.25 | 1.00 | 1890 |
| 10 | 99.999 | 1.00 | 0.50 | 1890 |
| 11 | 99.999 | 1.60 | 0.50 | 1890 |
| 12 | 99.999 | 2.25 | 0.50 | 1890 |
| 13 | 99.999 | 1.00 | 0.70 | 1890 |
| 14 | 99.999 | 1.60 | 0.70 | 1890 |
| 15 | 99.999 | 2.25 | 0.70 | 1890 |
| 16 | 99.999 | 1.00 | 1.00 | 1890 |
| 17 | 99.999 | 1.60 | 1.00 | 1890 |
| 18 | 99.999 | 2.25 | 1.00 | 1890 |
| 19 | 99.99 | 1.00 | 0.50 | 3570 |
| 20 | 99.99 | 1.60 | 0.50 | 3570 |
| 21 | 99.99 | 2.25 | 0.50 | 3570 |
| 22 | 99.99 | 1.00 | 0.70 | 3570 |
| 23 | 99.99 | 1.60 | 0.70 | 3570 |
| 24 | 99.99 | 2.25 | 0.70 | 3570 |
| 25 | 99.99 | 1.00 | 1.00 | 3570 |
| 26 | 99.99 | 1.60 | 1.00 | 3570 |
| 27 | 99.99 | 2.25 | 1.00 | 3570 |
| 28 | 99.999 | 1.00 | 0.50 | 3570 |
| 29 | 99.999 | 1.60 | 0.50 | 3570 |
| 30 | 99.999 | 2.25 | 0.50 | 3570 |
| 31 | 99.999 | 1.00 | 0.70 | 3570 |
| 32 | 99.999 | 1.60 | 0.70 | 3570 |
| 33 | 99.999 | 2.25 | 0.70 | 3570 |
| 34 | 99.999 | 1.00 | 1.00 | 3570 |
| 35 | 99.999 | 1.60 | 1.00 | 3570 |
| 36 | 99.999 | 2.25 | 1.00 | 3570 |

*FIG. 12A*

Table 2

| Test # | Nitrogen gas purity [%] | Gas volume flow rate [Nm³/h] | Drilling fluid vol. [l/h] | Pressure gas inlet [barg] | Temperature mud inlet [°C] | Dissolved oxygen drilling fluid [ppb] | Dissolved oxygen drilling fluid inlet [ppb] | G/L ratio of vol. flows |
|---|---|---|---|---|---|---|---|---|
| 1 | 99.99 | 2.39 | 738 | 0.3 | 19.8 | 55 | >4500 ppm, as supplied from Transocean | 3 |
| 2 | 99.99 | 0.50 | 360 | 0.05 | 19.9 | 22 | >4500 ppb | 1 |
| 3 | 99.99 | 0.63 | 360 | 0.05 | 19.9 | 20 | >4500 ppb | 2 |
| 4 | 99.99 | 0.76 | 360 | 0.05 | 19.9 | 19 | >4500 ppb | 2 |
| 5 | 99.99 | 1.01 | 360 | 0.1 | 19.9 | 19 | >4500 ppb | 3 |
| 6 | 99.99 | 1.01 | 200 | 0.1 | 20 | 15 | >4500 ppb | 5 |
| 7 | 99.99 | 1.13 | 432 | 0.1 | 19.9 | 13 | >4500 ppb | 3 |
| 8 | 99.99 | 1.01 | 342 | 0.05 | 21 | 37 | >4500 ppb | 3 |
| 9 | 99.99 | 0.76 | 198 | 0.05 | 21 | 57 | >4500 ppb | 4 |
| 10 | 99.99 | 0.25 | 144 | 0 | 20.2 | 65 | >4500 ppb | 2 |
| 11 | 99.99 | 0.58 | 248 | 0 | 20.4 | 77 | >4500 ppb | 2 |
| 12 | 99.99 | 1.01 | 222 | 0.05 | 20.5 | 180 | >4500 ppb | 5 |
| 13 | 99.99 | 1.01 | 277 | 0.05 | 20.5 | 190 | >4500 ppb | 4 |
| 14 | 99.99 | 0.25 | 205 | 0.05 | 20.5 | 13 | 3710 | 1 |
| 15 | 99.99 | 0.25 | 251 | 0.05 | 20.5 | 21 | 3710 | 1 |
| 16 | 99.99 | 0.25 | 277 | 0.05 | 20.5 | 35 | 3710 | 1 |
| 17 | 99.99 | 0.25 | 315 | 0.05 | 20.5 | 100 | 3710 | 1 |
| 18 | 99.99 | 0.50 | 151 | 0.05 | 20.5 | 31 | 3710 | 3 |
| 19 | 99.99 | 0.50 | 164 | 0.05 | 20.5 | 43 | 3710 | 3 |
| 20 | 99.99 | 0.50 | 238 | 0.05 | 20.5 | 38 | 3710 | 2 |
| 21 | 99.99 | 0.50 | 254 | 0.05 | 20.5 | 84 | 3710 | 2 |
| 22 | 99.99 | 0.76 | 162 | 0.1 | 20.5 | 35 | 3710 | 5 |
| 23 | 99.99 | 0.76 | 201 | 0.1 | 20.5 | 55 | 3710 | 4 |
| 24 | 99.99 | 0.76 | 243 | 0.1 | 20.5 | 78 | 3710 | 3 |
| 25 | 99.999 | 0.25 | 141 | 0.05 | 20.5 | 28 | 3710 | 2 |
| 26 | 99.999 | 0.25 | 233 | 0.05 | 20.6 | 92 | 4400 | 1 |
| 27 | 99.999 | 0.25 | 300 | 0.05 | 20.6 | 113 | 4400 | 1 |

*FIG. 12B*

Table 3

| Test # | Nitrogen gas purity | Gas volume flow rate | Drilling fluid vol. flow rate | Pressure gas inlet | Temperature mud inlet | Dissolved oxygen drilling fluid | Dissolved oxygen drilling fluid | G/L ratio of vol. flows |
|---|---|---|---|---|---|---|---|---|
| | [%] | [Nm³/h] | [l/h] | [barg] | [°C] | [ppb] | [ppb] | |
| 30 | 99.999 | 0.38 | 1200 | 0.05 | 19 | 111 | 4500 | 0 |
| 31 | 99.999 | 0.76 | 363 | 0.3 | 20 | 60 | 4500 | 2 |
| 32 | 99.999 | 0.50 | 454 | 0.2 | 20 | 260 | 5900 | 1 |
| 33 | 99.999 | 0.50 | 648 | 0.2 | 20 | 385 | 5900 | 1 |
| 34 | 99.999 | 0.50 | 1210 | 0.2 | 20 | 419 | 5900 | 0.4 |
| 35 | 99.999 | 0.50 | 790 | 0.2 | 20 | 540 | 5900 | 1 |
| 36 | 99.999 | 0.88 | 825 | 0.4 | 20 | 750 | 5900 | 1 |
| 37 | 99.999 | 1.13 | 1067 | 0.6 | 20 | 1130 | 5900 | 1 |

*FIG. 12C*

SYSTEMS AND METHODS FOR PREVENTING CORROSION OF DRILL EQUIPMENT DUE TO DRILLING FLUID

CROSS-REFERENCE TO RELATED APPLICATIONS

This application is a Section 371 of International Application No. PCT/EP2021/078356, filed Oct. 13, 2021, which was published in the English language on Apr. 21, 2022, under International Publication No. WO 2022/079120, which claims priority to U.S. Provisional Patent Application No. 63/090,978, filed Oct. 13, 2020, the disclosures of each of which are incorporated herein by reference in their entireties.

TECHNICAL FIELD

The present disclosure generally relates to well construction processes and, in particular, to systems and methods for preventing corrosion of drill equipment such as drill string, riser, and blowout preventer.

BACKGROUND

In drilling engineering, corrosion of drilling equipment such as drill string is a common phenomenon. This problem is becoming increasingly relevant with the development of high speed and deep well drilling. Drilling fluids usually tend to exhibit a strong corrosive effect under the temperature and pressure conditions that are found in a wellbore because the drilling fluids tend to contain oxygen. The drilling corrosion loss accounts for a significant proportion of the entire cost of drilling due to equipment failure and loss of the materials. Accordingly, there exists a need for systems and methods for treatment of the drilling fluid such that the corrosion of the drilling equipment is reduced or avoided.

SUMMARY

Reducing corrosion resulting from drilling fluid interacting with the drilling equipment is important for minimizing the well construction costs. In particular, oxygen dissolved in the drilling fluid needs to be removed to minimize the corrosive effects of the drilling fluid.

Consistent with a disclosed embodiment a method of removing oxygen from drilling fluid is provided. The method includes pumping the drilling fluid into a first inlet of a mixer, such that the drilling fluid is flowing in a first direction. Further the method includes pumping a gas including nitrogen into a second inlet of the mixer to mix the gas with the drilling fluid, the second inlet being downstream of the drilling fluid. The method includes flowing the gas in an opposite direction from the first direction, thereby permitting mass transfer of the oxygen from the drilling fluid to the gas to produce a deoxygenated drilling fluid; and discharging the deoxygenated drilling fluid from an outlet of the mixer.

Consistent with another disclosed embodiment, a method of decreasing corrosion on a drilling equipment is provided. The method includes pumping drilling fluid into a first inlet of a mixer, such that the drilling fluid is flowing in a first direction. Further the method includes pumping a gas including nitrogen into a second inlet of the mixer to mix the gas with the drilling fluid, the second inlet being downstream of the drilling fluid. The method includes flowing the gas in an opposite direction from the first direction, thereby permitting mass transfer of the oxygen from the drilling fluid to the gas to produce a deoxygenated drilling fluid, discharging the deoxygenated drilling fluid from an outlet of the mixer; and contacting the deoxygenated drilling fluid with the drilling equipment during drilling operation.

Consistent with another disclosed embodiment, a method of decreasing corrosion on a drilling equipment is provided. The method includes contacting deoxygenated drilling fluid with the drilling equipment during drilling operation, wherein the deoxygenated drilling fluid is produced by pumping drilling fluid into a first inlet of a mixer, such that the drilling fluid is flowing in a first direction. Further, the deoxygenated drilling fluid is produced by pumping a gas including nitrogen into a second inlet of the mixer to mix the gas with the drilling fluid, the second inlet being downstream of the drilling fluid. Further, the deoxygenated drilling fluid is produced by flowing the gas in an opposite direction from the first direction, thereby permitting mass transfer of the oxygen from the drilling fluid to the gas to produce the deoxygenated drilling fluid.

The foregoing general description and the following detailed description are exemplary and explanatory only and are not restrictive of the claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3B are example views of a gas inlet for the system of FIG. 3A, according to an embodiment.

FIG. 3C is an example mixing element for the system of FIG. 3A, according to an embodiment.

FIG. 12A is a table showing conducted tests for determining the effectiveness of the system for removing oxygen from a drilling fluid, according to an embodiment.

FIGS. 12B-12C are results of conducted tests for determining the effectiveness of the system for removing oxygen from a drilling fluid, according to an embodiment.

DETAILED DESCRIPTION

Aspects of the present disclosure are related to systems and methods of reducing corrosion due to a drilling fluid, such as drilling mud, when it interacts with drilling equipment. To reduce corrosion, at least a portion of or substantially all oxygen is removed from the drilling fluid prior to the drilling fluid contacting the drilling equipment. Consistent with a disclosed embodiment, the drilling fluid is pumped into a first inlet of a mixer, the drilling fluid flowing in a first direction. A gas including nitrogen is pumped into a second inlet of the mixer to mix the gas with the drilling fluid, the second inlet being downstream of the drilling fluid, the gas flowing in an opposite direction from the first direction, thereby permitting mass transfer of the oxygen from the drilling fluid to the gas to produce a deoxygenated drilling fluid. The deoxygenated drilling fluid is then discharged from an outlet of the mixer. The mixer may be any suitable enclosure. For example, the mixer may be a reservoir, such as a metal tank, or any other reservoir (e.g., a tank in a form of a column) that can house the drilling fluid without chemically reacting with the drilling fluid. In some cases, the drilling fluid is pumped into the mixer using a suitable pump. For example, for pumping the drilling fluid a centrifugal pump may be used. Alternatively, the drilling fluid may be guided into the mixer using a force of gravity. In some cases, both pumping and gravity are utilized to move the drilling fluid into the mixer.

Figure 1:
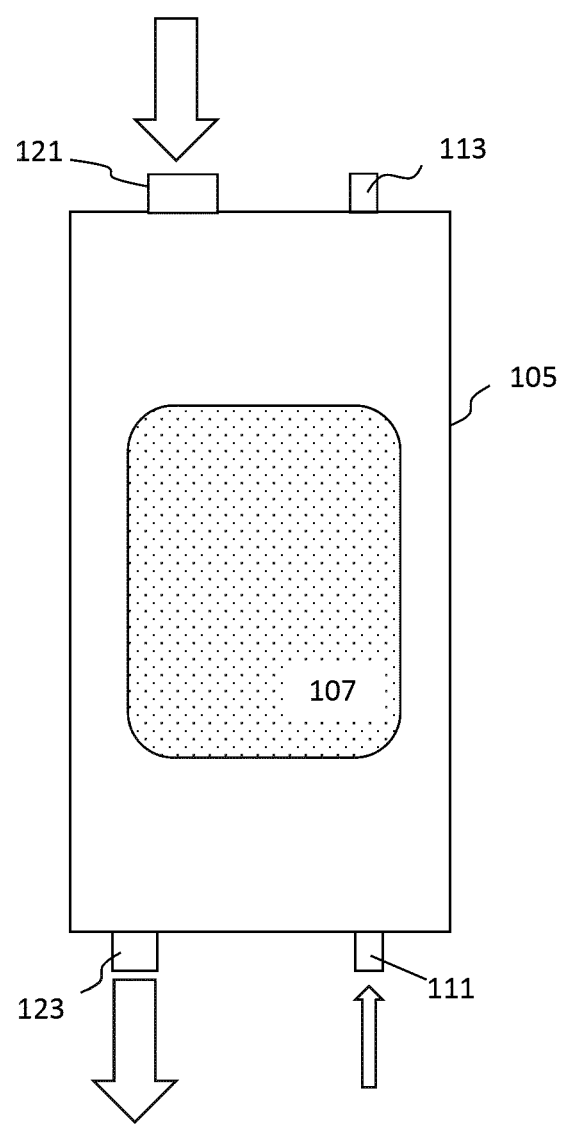
FIG. 1 is an example schematic of a system for removing oxygen from a drilling fluid, according to an embodiment.

FIG. 1 shows an example system 100 for removing oxygen from the drilling fluid. The drilling fluid is configured to enter a mixer 105 via a first inlet 121, and flow in a first direction (e.g., the drilling fluid may enter mixer 105 at first inlet 121 located in a top portion of mixer 105 and may travel downwards due to gravity). Further, gas is pumped into mixer 105 through a second inlet 111. In an example embodiment, the gas includes nitrogen. For example, in an embodiment, the gas includes at least about 80%, at least about 85%, at least about 90%, at least about 95%, or at least about 99% nitrogen by volume (when measured at standard temperature and pressure). In another embodiment, the gas includes at least about 80%, at least about 85%, at least about 90%, at least about 95%, or at least about 99% argon by volume (when measured at standard temperature and pressure). The gas is configured to mix with the drilling fluid, thus, in an example embodiment, the gas is pumped in a second direction, such that the second direction is substantially in an opposite direction from the first direction, thereby permitting mass transfer of the oxygen from the drilling fluid to the gas to produce a deoxygenated drilling fluid. In various embodiments, second inlet 111 is located downstream of the drilling fluid (thus, the drilling fluid is flown towards second inlet 111). In some cases, while the drilling fluid is pumped into a top portion of mixer 105 and is configured to flow downwards, the gas is pumped into second inlet 111 located at a bottom portion of mixer 105, and is configured to move upwards towards a top portion of mixer 105. The drilling fluid and the gas meet and interact through a middle section 107 of mixer 105, and in section 107, a mass transfer of the oxygen from the drilling fluid to the gas takes place.

It should be noted that in some other embodiments, the gas may be pumped in the second direction that is not substantially opposite to the first direction. For example, the gas may be pumped perpendicular to the flow of drilling fluid, or, in some cases, substantially parallel to the flow of drilling fluid. Further, the gas may enter mixer 105 at a location that is different from the bottom location. For example, second inlet 111 may be located in a side of mixer 105, or in some cases, in a top portion of mixer 105. In some embodiments, second inlet 111 is oriented normal to a surface of mixer 105 adjacent to second inlet 111. Alternatively, in other embodiments, second inlet 111 may be oriented such that a flow of the gas has a tangential component to the surface of mixer 105 adjacent to second inlet 111.

After interaction between the drilling fluid and the gas, the deoxygenated drilling fluid is discharged from the mixer via a first outlet 123, while the gas is discharged via a second outlet 113. For example, first outlet 123 may be located at the bottom of mixer 105 and second outlet 113 is located at the top of mixer 105. The deoxygenated drilling fluid discharged from first outlet 123 is collected into a suitable container 125 and is used for various drilling operations. For example, the deoxygenated drilling fluid is used to contact drilling equipment during drilling operation. In an example embodiment, the drilling equipment includes any suitable drilling equipment that is configured to interact with the drilling fluid. For example, such equipment may include a drill string, a riser, or a blowout preventer.

Consistent with some embodiments, mixer 105 includes section 107 (e.g., a middle portion of the mixer) with structured packing configured to increase a surface area through which the drilling fluid is interacting with the gas. In some embodiments, section 107 with structured packing has a length in a range of a meter to a few tens of meters, e.g., a meter to 6 meters. In an example embodiment, the length may be a few meters, such as about 3 meters, about 3.5 meters, about 4 meters, about 4.5 meters, about 5 meters, about 5.5 meters, or about 6 meters. For example, section 107 containing the structured packing has a length of at least about two meters, at least about three meters, at least about four meters, at least about five meters, at least about six meters, at least about seven meters, at least about eight meters, at least about nine meters, at least about ten meters, or any other value in between a meter and a few tens of meters.

In various embodiments, a suitable drilling fluid regulator (herein also referred to as a controller) is used to regulate a flow rate of the drilling fluid before the drilling fluid enters first inlet 121. In some cases, the drilling fluid regulator may be coupled to an oxygen sensor configured to determine the level of oxygen in the drilling fluid. In an example embodiment, the oxygen sensor may be any suitable sensor for measuring the level of oxygen (e.g., optical sensor utilizing infrared radiation, or any other suitable sensor, such as a chemical sensor, electrical sensor, electrooptical sensor, and the like). Depending on feedback data determined by the oxygen sensor, the drilling fluid regulator may be configured to increase or reduce a flow of the drilling fluid. In some embodiments, the flow rate of the drilling fluid is at least about 40 cubic meters per hour, at least about 100 cubic meters per hour, at least about 150 cubic meters per hour, at least about 200 cubic meters per hour, at least about 250 cubic meters per hour, or at least about 300 cubic meters per hour. In some embodiments, the flow rate of the drilling fluid is no more than about 4000 cubic meters per hour, no more than about 3400 cubic meters per hour, no more than about 3000 cubic meters per hour, or no more than about 2500 cubic meters per hour. Combinations of the above-referenced ranges for the flow rate are also contemplated. For example, the flow rate may be in a range of about 40 to 3400 cubic meters per hour, including all flow rate values and sub-ranges in between.

In some cases, if the level of oxygen, as determined by the oxygen sensor, is above a target threshold, the drilling fluid regulator may be configured to reduce the flow rate of the drilling fluid. Alternatively, if the amount of oxygen as determined by the oxygen sensor is below the target threshold, the drilling fluid regulator may be configured to increase the flow rate of the drilling fluid. In an example embodiment, the target threshold may be determined by a percentage of oxygen removed from the drilling fluid. For example, the target threshold may include removing at least about 90%, at least about 95%, or at least about 99% of the oxygen from the drilling fluid. In some cases, any other suitable target threshold may be used. For example, the target threshold may require removing oxygen in a range of 70-99% including all the percent values and sub-ranges in between. Additionally, the target threshold may be determined by a molar fraction, volume fraction, or mass fraction of oxygen in the drilling fluid. In an example embodiment, the amount of the oxygen may be reported in parts per billion. The deoxygenated drilling fluid may be required to have less than a target threshold of the oxygen. For example, the target threshold may be less than about 20 parts per billion (ppb), less than about 15 ppb, or less than about 10 ppb, and the like.

In some cases, more than one oxygen sensors may be used. For example, a first oxygen sensor may measure a concentration of oxygen in the drilling fluid before deoxygenation, and a second oxygen sensor may be used to measure a concentration of oxygen in the discharged drilling fluid after the deoxygenation. Alternatively, in some cases, a single oxygen sensor may be used for both of the measurements. For example, a first sample of the drilling fluid before the deoxygenation may be submitted to the oxygen sensor during the first measurement, and a second sample of the drilling fluid after the deoxygenation may be submitted to the oxygen sensor during the second measurement. For instance, the first sample may be delivered to the oxygen sensor using a first position of one or more valves, and the second sample may be delivered to the oxygen sensor using a second position of the one or more valves.

Further, another gas regulator may be present and may be configured to regulate the flow rate of the gas entering the mixer. The gas regulator is coupled to second inlet 111. In some cases, the gas regulator may be coupled to an oxygen sensor configured to determine the level of oxygen in the discharged drilling fluid. Similar to the operation of drilling fluid regulator, based on feedback data determined by the oxygen sensor, the gas regulator may be configured to increase or reduce a flow rate of the gas. For example, if the level of oxygen as determined by the oxygen sensor is above a target threshold, the gas regulator may be configured to increase the flow rate of the gas. Alternatively, if the level of oxygen as determined by the oxygen sensor is below the target threshold, the gas regulator may be configured to reduce the flow rate of the gas. In an example embodiment, the flow rate of the gas may be in a range of about 50-500 cubic meters per hour measured at standard temperature and pressure ($Nm^3/h$), including all flow rate values and sub-ranges in between. Alternatively, the flow rate of the gas may be dependent on the flow rate of the drilling fluid as further described below in relation to FIG. 7.

In some cases, instead of regulating a flow rate of the gas, the gas regulator may be configured to regulate a pressure of the gas before the gas enters the second inlet. Additionally, both the gas pressure and the gas flow rate may be regulated simultaneously.

Further, in some cases, the gas may be heated to a temperature that is greater than a target temperature (e.g., the target temperature may be about 20° C.), before flowing the gas into the second inlet of the mixer. Heating the gas improves mass transfer efficiency of oxygen out of the drilling fluid. In an example embodiment, the gas may be heated by passing next to a heating element (e.g., an enclosure filled with a warm fluid, or any other suitable heating element).

Figure 2:
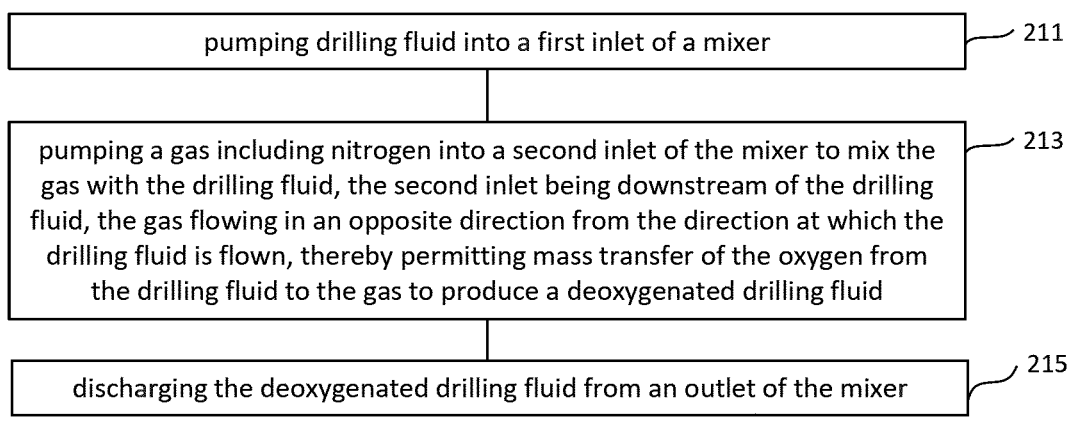
FIG. 2 is an example process of removing oxygen from a drilling fluid, according to an embodiment.

FIG. 2 shows an example process 200 for removing oxygen from the drilling fluid. At step 211 of process 200, the drilling fluid is pumped into first inlet 121 of a mixer (e.g., mixer 105, as shown in FIG. 1). At step 213, the gas is configured to be pumped into a second inlet (e.g., second inlet 111, as shown in FIG. 1) of mixer 105 to mix the gas with the drilling fluid. In the example embodiment, the gas includes nitrogen. Further, second inlet 111 is located downstream of the drilling fluid, and the gas is configured to flow in an opposite direction from the direction at which the drilling fluid is flown, thereby permitting mass transfer of the oxygen from the drilling fluid to the gas to produce a deoxygenated drilling fluid. Further, at step 215, the deoxygenated drilling fluid is discharged from an outlet (e.g., outlet 123, as shown in FIG. 1) of mixer 105.

Figure 3A:
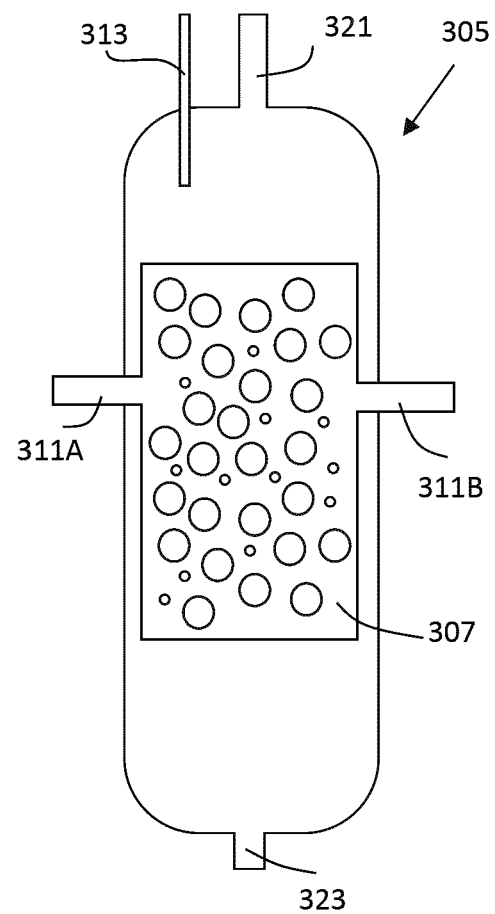
FIG. 3A is an example system having a mixer for removing oxygen from a drilling fluid, according to an embodiment.

FIG. 3A shows an example embodiment of mixer 305 with a first inlet 321 for a drilling fluid, and first outlet 323 for the deoxygenated the drilling fluid. In an example embodiment, mixer 305 may include more than one inlet for gas. For example, mixer 305 may include inlets 311A and 311B for the gas to enter mixer 305. It should be noted than any suitable number of inlets for the gas may be used. For example, the gas may be delivered throughout the side walls of mixer 305 in order to evenly distribute the flow of gas through a section 307 in which the gas and the drilling fluid is configured to mix, thus, resulting in mass transfer of the oxygen from the drilling fluid to the gas. FIG. 3A further shows an outlet 313 that is used for the gas to exit mixer 305. In an example embodiment, outlet 313 is located in a top portion of mixer 305 and directed normal to a surface of mixer 305 adjacent to the location of outlet 313, however, other locations and/or orientations of outlet 313 may be possible (e.g., outlet 313 may be located at a side of mixer 305).

In various embodiments, inlet 311A and/or inlet 311B may be oriented at an angle relative to a normal direction to a surface adjacent to the inlet 311A (and/or inlet 311B) such that a flow of gas has a nonzero tangential component to the surface. For example, FIG. 3B shows that inlet 311A is oriented at an angle $\theta$ that is more than zero degrees (zero-degree angle $\theta$ corresponds to inlet 311A directed normal to the surface). Such orientation results in circulation of gas as indicated by an example streamline 312.

In some cases, the drilling fluid may be configured to enter mixer 305 through inlet 321 that is oriented at an angle being more than zero degrees, as measured to a surface normal, for the surface adjacent to inlet 321. Such orientation of inlet 321 may allow further mixing of the drilling fluid with the gas. Additionally, in some implementations of mixer 305, mixing elements, such as mixing element 315, as shown in FIG. 3C, may be presented, and may be used to promote further actuating of the drilling fluid. In some cases, mixing element 314 includes one or more blades to facilitate mixing.

Figure 4:
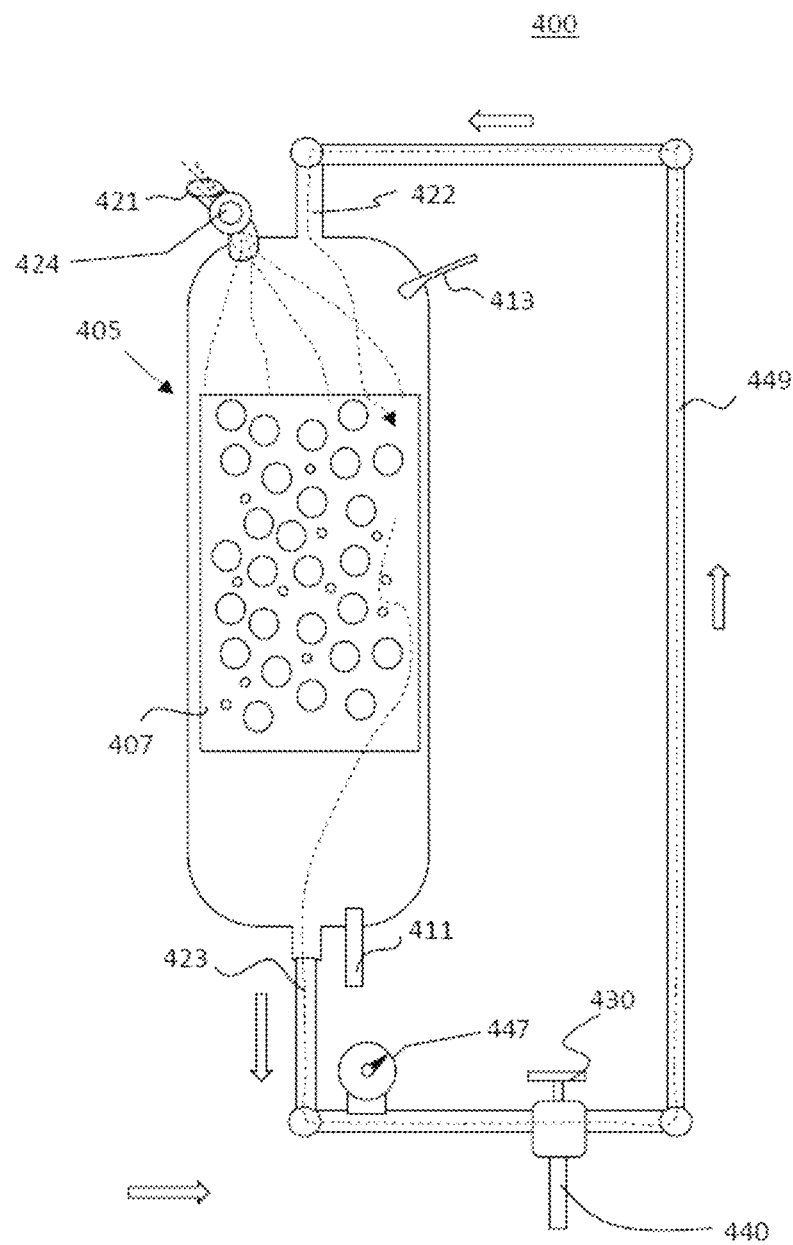
FIG. 4 is an example embodiment of a system for removing oxygen from a drilling fluid, in which the drilling fluid is configured to circulate through the system, according to an embodiment.

FIG. 4 shows an example embodiment of system 400 configured to allow a drilling fluid to circulate through mixer 405 until sufficient deoxygenation of the drilling fluid is obtained. In an example embodiment, mixer 405 includes a first inlet 421 through which drilling fluid is entering mixer 405. First inlet 421 is controlled by a valve 424 configured to open or close first inlet 421. Further, gas is flown into inlet 411 and exits mixer at outlet 413. The drilling fluid is configured to mix with the gas in section 407 and become at least partially deoxygenated. The deoxygenated drilling fluid exits at second outlet 423, and oxygen levels are measured by oxygen sensor 447. If the oxygen levels are below a required target threshold, the drilling fluid is determined to be sufficiently deoxygenated, and it may exit system via outlet 440 controlled by a valve 430. For example, valve 430 is configured to open when the drilling fluid is sufficiently deoxygenated and allow the drilling fluid to exit via outlet 440. Alternatively, if the drilling fluid is not sufficiently deoxygenated, as determined by oxygen sensor 447, valve 430 is configured to be closed and the drilling fluid circulates back into mixer 405 via connection 449 and enters mixer 405 via inlet 422. Circulation of the drilling fluid may be repeated several times until a suitable level of deoxygenation is reached. In various embodiments, operation of valve 430 is correlated with the operations of valve 424. For example, when valve 430 is open, valve 424 is configured to be open, and when valve 430 is closed, valve 424 is configured to be closed. In various embodiments, a flow rate of drilling fluid entering and exiting mixer 405 is controlled by valve 430.

Figure 5:
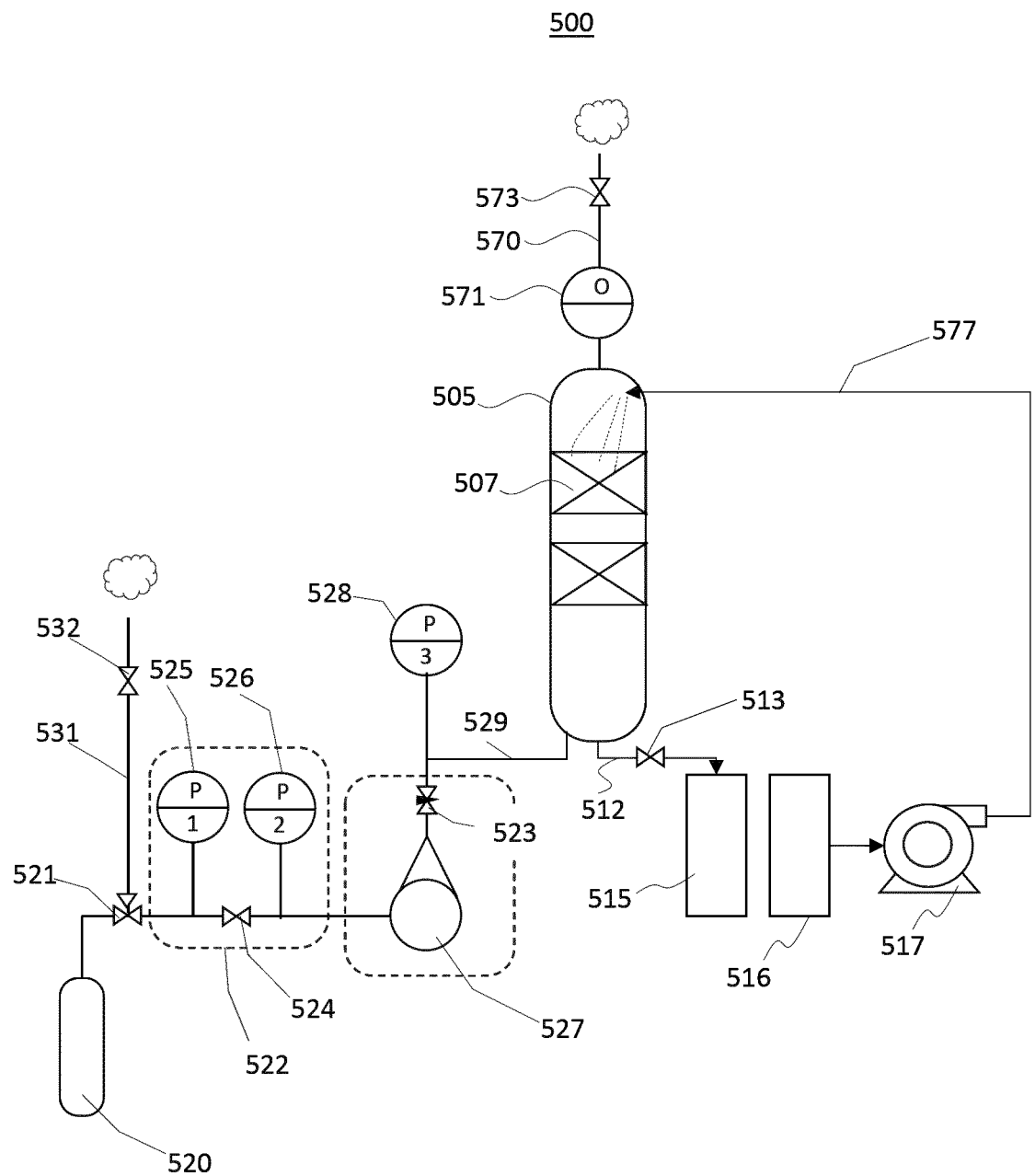
FIG. 5 is an example embodiment of a system for removing oxygen from a drilling fluid, according to an embodiment.

FIG. 5 shows an example embodiment of a system 500 for removing oxygen from the drilling fluid. System 500 is structurally and functionally similar to systems 100 and 400. The system includes mixer 505 having a mixing section 507. In an example embodiment, drilling fluid is stored in a tank 516 and pumped using pump 517 into a top portion of mixer 505 via channel 577. Upon entering mixer 505, the drilling fluid is mixed with a gas in section 507. In an example embodiment, the section 507 includes structured packing configured to increase a surface area through which the drilling fluid is interacting with the gas. In the example embodiment, as shown in FIG. 5, the gas may be stored in a tank 520 and is configured to enter mixer 505 via connection 529. The gas may pass through valve 521 and pressure regulator 522. In an example embodiment, pressure regulator 522 is used to reduce the pressure from the pressure of tank 520 to a desired pressure that is accepted by a rotameter 527 having a needle valve 523. In an example embodiment, rotameter 527 with needle valve 523 is configured to control a flow rate of the gas into mixer 505. The pressure regulator 522 is used to reduce a pressure to a prescribed pressure (e.g., to 10 bar) that is needed for the rotameter 527. As shown in FIG. 5, pressure regulator 522 may include manometers 525 and 526 and a suitable valve 524. For example, manometer 525 is configured to measure gas pressure before valve 524, and manometer 526 is configured to measure the pressure after valve 524. Valve 524 may operate to cause a required pressure to be measured by manometer 526. In some cases, valve 521 may be connected to an outlet 531 for venting some of the gas via valve 532 in an ambient environment.

The deoxygenated drilling fluid is configured to be collected in a tank 515 using channel 512 equipped with a suitable valve 513 (e.g., valve 513 is configured to open to release the deoxygenated drilling fluid into tank 515). Further, the gas supplied via connection 529 is configured to be vented via outlet 570 using valve 573. In various embodiments, an oxygen sensor 571 may be placed at the outlet 570 and may be configured to measure the amount of oxygen in the gas. By measuring the change of oxygen level in the gas, system 500 can determine the amount of deoxygenation of the drilling fluid (e.g., the amount of oxygen transported by the gas is the same as the amount of oxygen extracted from the drilling fluid). Using oxygen sensor 571 to determine oxygen content in the gas, instead of determining the oxygen content of the drilling fluid may be beneficial, as it might be easier to establish the oxygen content in the gas. For example, oxygen sensor 571 may be an optical oxygen sensor as known in art, while, depending on the drilling fluid the optical sensor may not be employed (e.g., if the drilling fluid is opaque to an optical wavelength used by the optical sensor).

While in some embodiments, the gas may be released into the ambient, in some other embodiments, the gas may be recirculated and recycled by removing the oxygen from the gas. For example, the oxygen may be removed from the gas through any suitable catalytic process (as known in the art) that removes the oxygen from the gas.

In various embodiments, system 500 may include additional components for treating the drilling fluid (e.g., the oxygenated drilling fluid) or deoxygenated drilling fluid. For example, the drilling fluid may be filtered, heated, cooled, mixed, stored for a duration of time to reduce foam, or bubbles present in the fluid, and the like. In an example embodiment, a filter may be placed within outlet 577, and may be configured to remove impurities and/or foam in the drilling fluid.

In some cases, volume flow rates for the drilling fluid and the gas are selected to ensure that no (or little) foam is produced in the drilling fluid. Further, various containers (e.g., tank 515) are used to allow the deoxygenated drilling fluid to "rest" (e.g., to be stored for a duration of time) to ensure that foam bubbles are not present in the drilling fluid.

In some embodiments, the drilling fluid is pumped at a first volume flow rate, the gas is pumped at a second volume flow rate, and the ratio of the second to the first volume flow rate is at least one, e.g., at least 1.1, at least 1.2, at least 1.3, at least 1.4, at least 1.5, at least 1.6, at least 1.7, at least 1.8, at least 1.9, at least 2.0, at least 2.1, at least 2.2, at least 2.3, at least 2.4, or at least 2.5.

In some embodiments, the drilling fluid is pumped at a first volume flow rate, the gas is pumped at a second volume flow rate, and the ratio of the second to the first volume flow rate is selected such that the deoxygenated drilling fluid has an oxygen level below a target threshold.

Additionally, system 500 may include additional components for treating gas. For example, the gas may be heated prior to entering mixer 505. In an example embodiment, the gas supply tubes may pass next to a heating circulator water bath. In some embodiments, the gas, such as nitrogen, can be supplied from compressed nitrogen tanks (e.g., a tank may include 50 liters of gas at a pressure of 200 bar, and have a purity of 99.6%, or in some cases, a purity of 99.999%). Depending on the amount of drilling fluid that requires deoxygenation, one or multiple tanks may be used. Due to the Joule-Thompson effect, the nitrogen gas can have a temperature of around 5° C. immediately after being released from a gas tank when the pressure in the tank is at maximum value, thus heating of the gas is preferred.

In various embodiments, the flow rate of drilling fluid and gas through mixer 505 is adjusted based on the drilling fluid flow rate required for drilling application. Thus, the flow rate of drilling fluid and the gas can be increased or decreased in real time. In some cases, for applications in which a large amount of drilling fluid is needed rapidly, the deoxygenated drilling fluid may be stored in a suitable storage tank (e.g., tank 515). In some cases, tank 515 may be partially vented using the gas to further remove oxygen from the drilling fluid.

Figure 6:
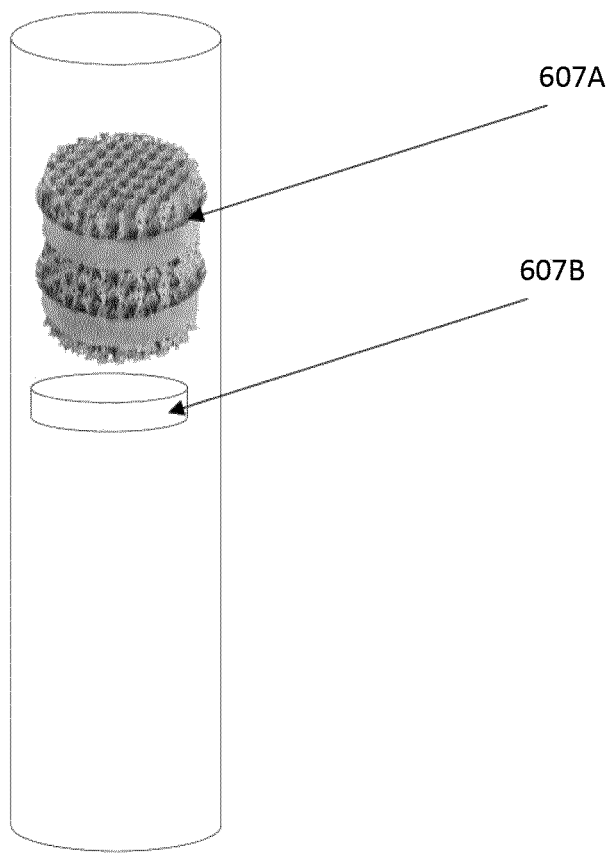
FIG. 6 shows example structured packing elements, according to an embodiment.

As described above, system 500 includes section 507 formed from structured packing configured to increase a surface area through which the drilling fluid is interacting with the gas. An example structured packing 607A or 607B is shown in FIG. 6. For example, structured packing 607A may include 60-80 mm Mellapak™, or any other suitable structured packing. As shown in FIG. 6 more than one type of structured packing may be used. For example, structured packing 607A may be of the first type and structured packing 607B may be of the second type. In an example embodiment, the structured packing may be parametrized by a total area A of the structured packing. As the total area increases, more interaction between drilling fluid and the gas is expected, as the interaction between the drilling fluid and the gas is expected in proximity of a surface of the structured packing.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, at least some operations of embodiments of the present technology may be implemented using hardware, firmware, software, or a combination thereof. When implemented in firmware and/or software, the firmware and/or software code can be executed on any suitable processor or collection of logic components, whether provided in a single device or distributed among multiple devices.

In this respect, various inventive concepts described herein may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form.

For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110. When the term "substantially" is used with directions, it generally means that the direction is plus or minus 10% of the direction stated.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Examples

To determine effectiveness of oxygen removal, tests were performed using drilling fluid PERFFLOW™ drilling fluid and 99.99% pure nitrogen gas. The tests were performed using a system as described below.

For the purpose of the lab scale tests 99.99% and 99.999% purity $N_2$ from cylinders are used in lieu of a deoxidizer $N_2$ regeneration system. The gas pressure is regulated through a regulator valve and the flow rate is controlled by a rotameter and needle valve. Verification of flow rate is done by calculating the amount of $N_2$ which has escaped the cylinder by observing the pressure reduction in the cylinder. The required nitrogen flow rate is calculated based on the required flow rate for a full-scale system. The lab scale test column has an ID of 84 mm. The gas flow is calculated to match the K-value of a full-size contactor. The packing height is not scalable, so the test column is a very tall and narrow design. The column consists of two Ø90 poly carbonate pipes. Each pipe has a length of 2050 mm, resulting in a column height in excess of 4 meters. This length can accommodate a packing height of approximately 3.6 meters. Although a 3.6 meter packing height may not be sufficient to achieve $O_2$ levels below 20 ppb, it gives a clear indication of deoxygenation performance. Packing height required to achieve <20 ppb $O_2$ levels in the fluid can then easily be calculated based on the test results from the lab test. An $N_2$ heating device can optionally be added to the system to simulate hot nitrogen coming from the deoxidizer. An elevated process temperature would improve mass transfer performance.

Preliminary calculations show that one theoretically can achieve <20 ppb $O_2$ levels with a packing height of 3.6 meters with a minimum process temperature of 20° C. which is achievable without gas heating as the tests are to be performed indoors.

The drilling fluid is transported from a tank/reservoir to the top of the column using a centrifugal pump. The pump is powered by an electric motor equipped with a frequency converter to enable variable pump RPM's in order to adjust the desired liquid flow rate. A manual valve is added to the fluid outlet in the bottom of the column in order to manually regulate the liquid level in the bottom of the column.

Provisions to take fluid samples at the outlet of the column is provided. Measurement of $O_2$ content in fluid samples may prove difficult to perform due to the nature of the fluid, however, optical sensors are suggested as an option and the method is being investigated for use. $O_2$ content in fluid can however be calculated based on the $O_2$ content in the $N_2$ gas exiting the top of the column provided we know the $O_2$ concentration of the untreated fluid entering the column. The amount of $O_2$ in $N_2$ is equal to amount of $O_2$ removed from fluid, so by equating the gas flow and the liquid flow we can tell what the $O_2$ level in the treated fluid is.

The performed tests are described by the test matrix as shown in FIG. 12A. The results of the tests shows that the counter current $N_2$ stripping process is effective in removing $O_2$ from drilling fluid.

Gasflow Rate Calculations

Gas flow rate is measured and controlled by a rotameter and also verified by calculating using the pressure in the gas cylinder. The real gas law states that $$PV = ZnRT \qquad (1)$$

Here P is pressure in nitrogen cylinder, V is volume of nitrogen cylinder, Z is the compressibility factor corresponding to the pressure and temperature, R is the universal gas constant, T is temperature. n is number of moles and can be rewritten as $n=m/M_w$ where m is mass and $M_w$ is molecular weight. When rewritten with respect to the mass it becomes $$m = PVM_w/ZRT \quad (2)$$

which gives the following statement for the volumetric flow based on pressure of the gas cylinder and time, t.

$$\dot{Q} = \frac{m_1 - m_2}{\Delta t \cdot \rho_{NC}} = \frac{\frac{P_1 V M w}{Z_1 RT} - \frac{P_2 V M w}{Z_2 RT}}{\Delta t \cdot \rho_{NC}} = \frac{V M w}{RT \cdot \Delta t \cdot \rho_{NC}} \left( \frac{P_1}{Z_1} - \frac{P_2}{Z_2} \right) \quad (3)$$

V, $M_w$, R, T, and $\rho_{NC}$ are constant (Assuming room temperature of 20° C., which is verified) and the expression can be simplified as $$\dot{Q} = \frac{0.05 \text{ m}^3 \cdot 28.0134 \cdot 10^{-3} \frac{\text{kg}}{\text{mol}}}{8.3144598 \frac{J}{\text{mol} \cdot K} 293.15 \, K \cdot 1.2506 \frac{\text{kg}}{\text{m}^3} \cdot \Delta t} \left( \frac{P_1}{Z_1} - \frac{P_2}{Z_2} \right) \quad (4)$$

which further simplifies to:

$$\dot{Q} = \frac{4.60 \cdot 10^{-7}}{\Delta t} \left( \frac{P_1}{Z_1} - \frac{P_2}{Z_2} \right) \quad (5)$$

The compressibility factors, Z, is dependent on pressure and is found from well-known tabulated values.

Mass Transfer Calculations

This calculation is not necessary for verifying the concept, as the measurements will verify the mass transfer. However, the calculation is useful for potential sizing and simulation in the future and to be able to quantify the rate of mas transfer from the drilling fluid. This calculation is performed for all cases if the experimental results prove sufficient to do so. For dilute mixtures, the molar flux can be approximated based on the log mean mass transfer calculation given by equation (4).

$$N_2 = k_c A (y - y^*)_{lm} \quad (6)$$

The equation is rewritten with respect to $$k_c A = N_{o2}/(y - y^*)_{lm} \quad (7)$$

$k_c$ is the mass transfer coefficient, A is the total surface area.

$$(y - y^*)_{lm} = \frac{(y - y^*)_1 - (y - y^*)_2}{\ln((y - y^*)_1 / (y - y^*)_2)} \quad (8)$$

The subscripts 1 and 2 denotes "top" and "bottom" of the column, y is the O2 mole fraction in the gas phase and is known at the bottom by the purity of the nitrogen supply. At the top, y is known either by calculation based on $O_2$ reduction in the liquid phase or by measurement at gas outlet, the former requires the assumption of $N_2$ saturation at outlet, and hence, the latter method is the preferred one. The $y^*$ is the mole fraction of oxygen which is required to be in equilibrium with the bulk fluid. This is known at the top (liquid inlet) as it is the atmospheric $O_2$ concentration. At liquid outlet (bottom) the equilibrium is calculated by assuming dilute mixture and applicability of Henry's law, meaning that $y^*=mx$, where m is proportional to the pressure and therefore m=H/P, where H is the Henry constant and P is the pressure. x is the mole fraction of $O_2$ in liquid, m, and hence H, is found experimentally at inlet conditions by measuring $x_{o2}$ and knowing $y^*$ from the atmospheric conditions. $y^*$ at outlet is equal to $x_{o2}$ at outlet times H/P.

This procedure describes a method for obtaining $k_c A$, if the experiments also were carried out with different length of the packing, $k_c$ could be isolated experimentally. However, if A is known, $k_c$ can be determined analytically.

Figure 7:
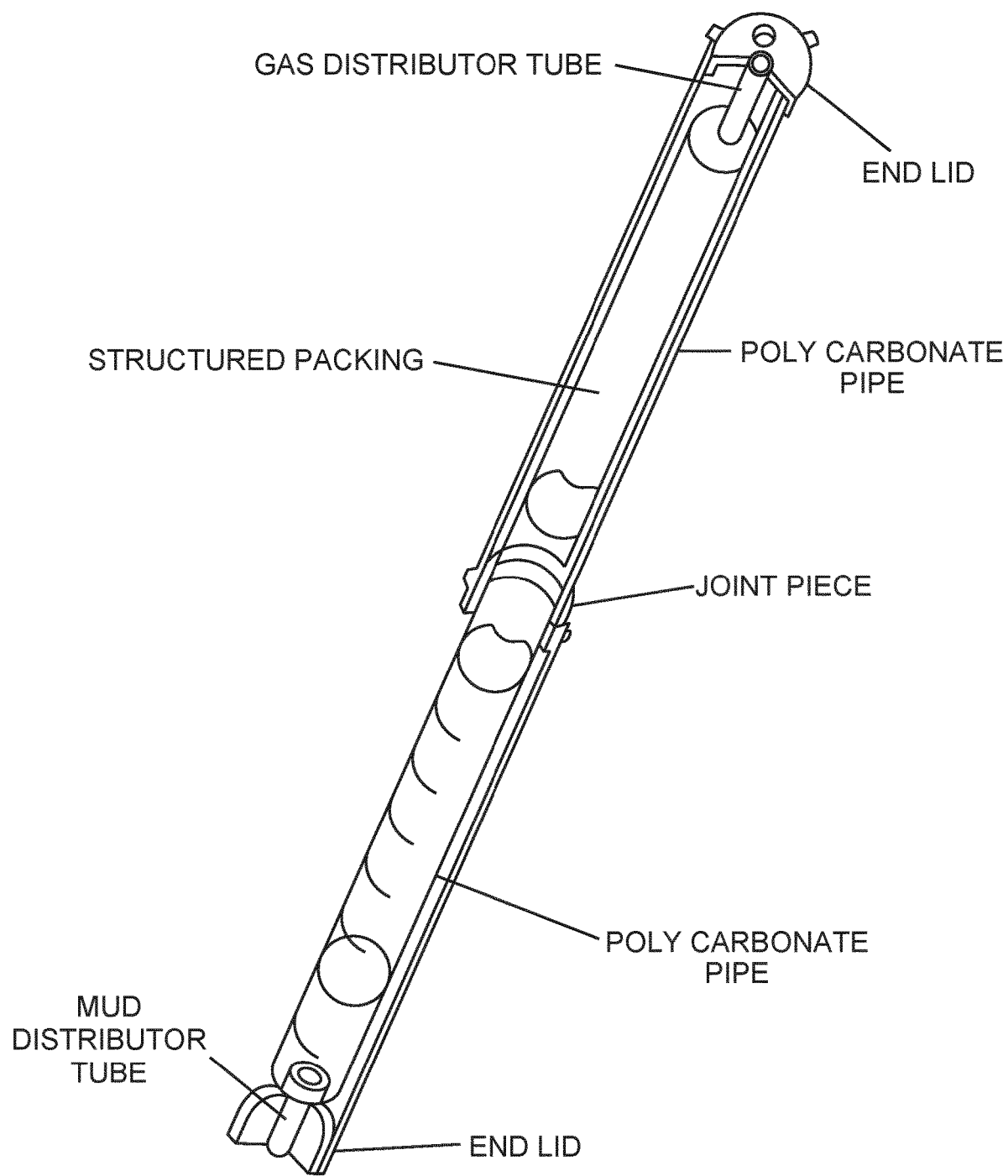
FIG. 7 is an example of a system for removing oxygen from a drilling fluid used in an experiment, according to an embodiment.

The experiment was conducted in a mixer as shown in FIG. 7. The mixer was formed from a joined poly carbonate pipes, having end lids at a top and bottom portion of the mixer. The structure of the mixer includes mud and gas inlets (in FIG. 7, these inlets are referred to as mud and gas distributor tubes). The poly carbonate pipes are joined together using a joint piece.

Figure 8:
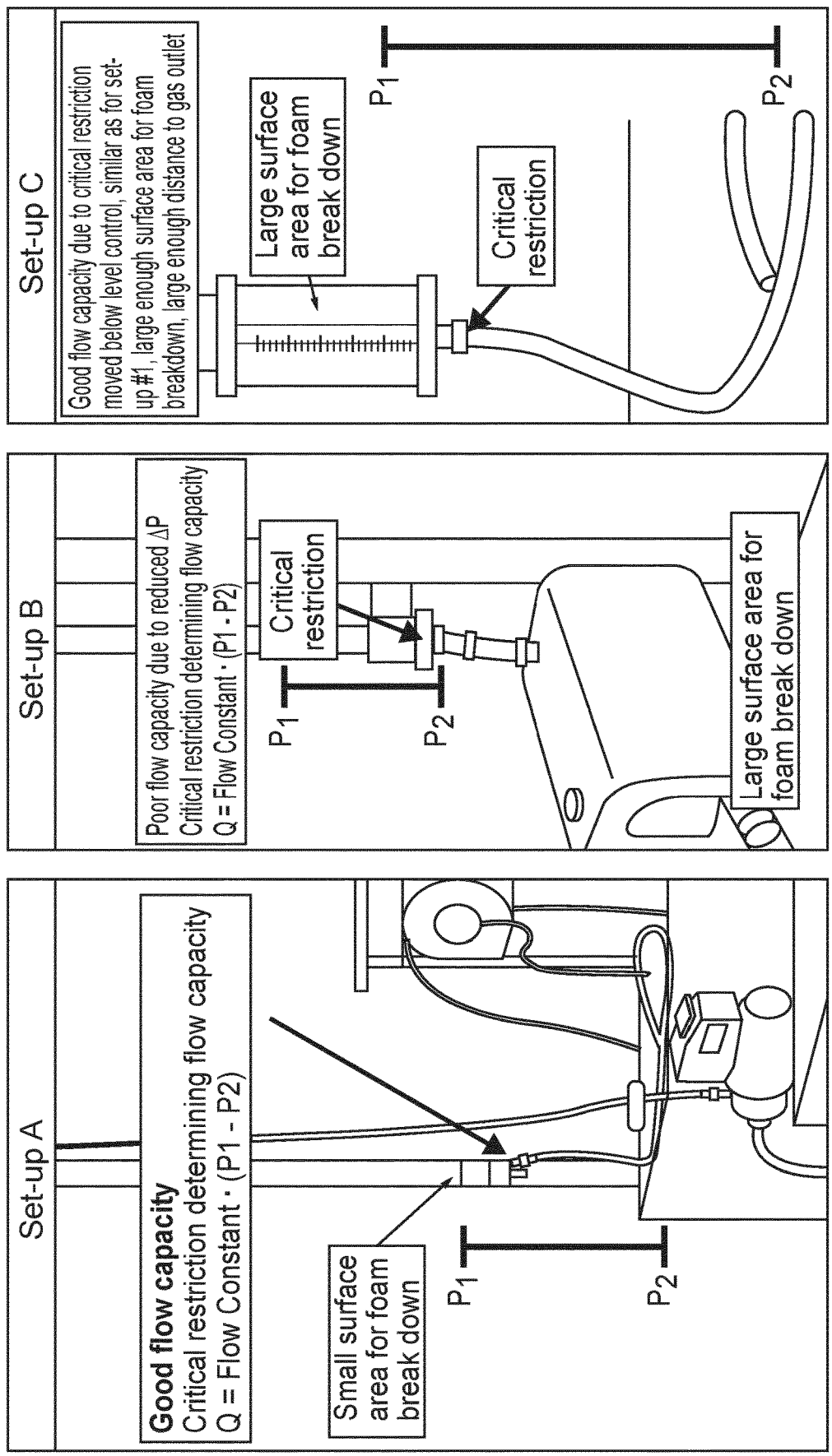
FIG. 8 are example experimental setups for removing oxygen from a drilling fluid, according to an embodiment.

FIG. 8 shows three types of experimental setups which are variations of a setup shown in FIG. 7. For example, set-up A utilizes a pipe restriction at a bottom portion of the mixer, set-up C utilizes large tank for reducing foam produced when deoxygenating drilling fluid, and set-up B utilizes a larger pipe for reducing foam produced when deoxygenating drilling fluid.

Figure 9:
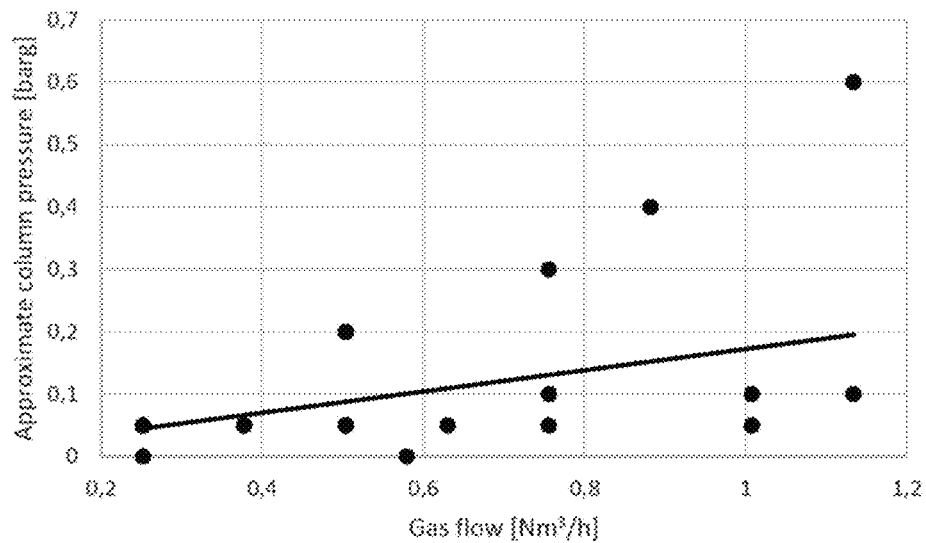
FIG. 9 is a plot of column pressures as a function of the volume flow rate of gas according to an embodiment.

FIG. 9 illustrates that column pressure (e.g., pressure at a bottom of the mixer, as shown in FIG. 7) may fluctuate with a volume flow rate of gas and tends to increase with the increased gas volume flow rate.

Figure 10:
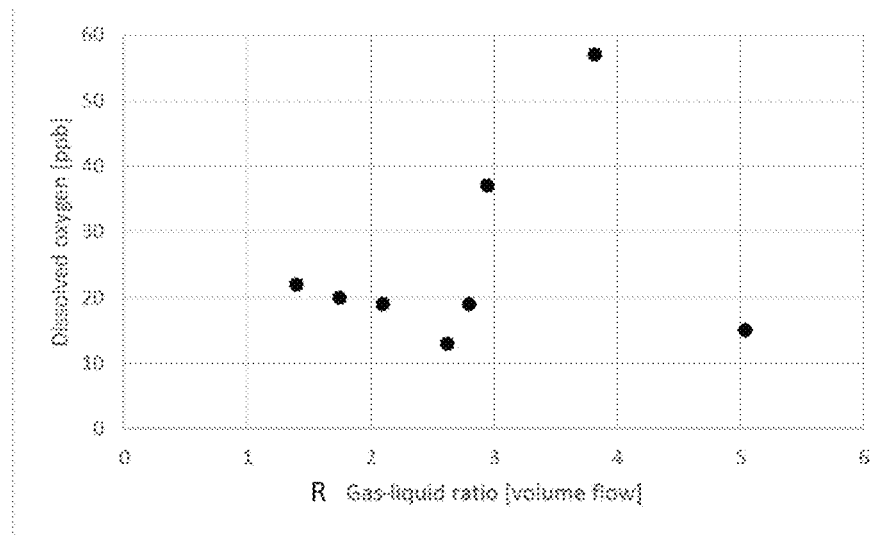
FIG. 10 is a plot of oxygen levels in deoxygenated drilling fluid as a function of a ratio of a volume flow rate of gas to a volume flow rate of drilling fluid according to an embodiment.

FIG. 10 shows an example data plot of level of oxygen in a deoxygenated drilling fluid after the drilling fluid interacts with the gas. The data plot was obtained by conducting a set of experiments (tests) further described in FIGS. 12A-12C. The oxygen data are plotted on y-axis, while on x-axis a ratio R of the gas volume flow rate to the volume flow rate of the drilling fluid is shown. In various embodiments, for sufficiently low oxygen levels (e.g., oxygen levels of less than 30 parts per billion (ppb)) ratio R may be higher than 1, and, in some implementations, may be higher than 2.

FIG. 10 corresponds to tests 2-9 (test 1 is omitted due to unreasonably high gas rate and large back pressure). These first tests (Test set-up A) successfully prove the concept of stripping oxygen from drilling fluid using nitrogen. Inlet dissolved oxygen concentration is as it was when the fluid was supplied. The dissolved oxygen concentration was measured to be "out of range" for the oxygen sensors that measure up to 4.5 ppm. It is reasonable to assume that the dissolved oxygen concentration was as it would be when saturated, or at least as high as it is offshore.

As described above, FIG. 10 shows gas-liquid ratio vs. dissolved oxygen at liquid outlet, and it proves efficient stripping down below 20 ppb. It is worth noting that these tests were conducted with only 1.89 m of packing and $N_2$ purity of 99.99%. Initially as the gas rate is increased, the dissolved oxygen concentration trends downwards, however, when reaching a certain point, the oxygen concentration increases. The reason for this is believed to be the increased backpressure from the gas outlet hose. The tests are performed at close to atmospheric pressure, and a little increase in frictional pressure drop will make a relatively large impact on the column pressure, shifting the oxygen equilibrium towards more dissolved oxygen in the liquid phase. As the gas rate is increased further, the equilibrium will again move towards the gas phase as the oxygen concentration in the gas phase will be low enough to overcome the negative impact of higher pressure.

In this set-up the mixer was too narrow to deal efficiently with accumulation of foam, which is believed to be the reason for slightly less efficient stripping as the test series proceeds beyond test 9. Tests 2-9 accurately represent foam-free stripping efficiency. A solution for the foam accumulation was implemented in test set-up B (as shown in FIG. 8).

As gas-liquid ratio and flow rates were experimented with, problems with build-up of foaming occurred. It was believed that most of the build-up was a result of too narrow column for effective foam breakdown. This means that it is believed that the problem with break-down of foam might be a problem for the lab scale only and that it does not necessarily pose a problem for full scale. An ad-hoc solution to the foaming build-up was to modify the location of the level control. The level control controls the amount of nitrogen used for stripping oxygen. In various embodiments, both oxygen and nitrogen contribute to foaming, thus, one may need to check that the drilling fluid is not oversaturated with nitrogen as this can increase the foaming problem.

In summary, the results indicate that moderate gas-liquid ratio, with high enough flow rates to be close to design rate for the packing provides good deoxygenation results.

Test set-up B is modified with a container downstream of the column. The intention is to regulate the liquid level in the container with the sole purpose of increasing the liquid surface area for foam break down. The method solved the problem with foam build-up; however, it greatly reduced the capacity of the column due to reduced ΔP across the fitting at the bottom of the column (see illustration).

Figure 11:
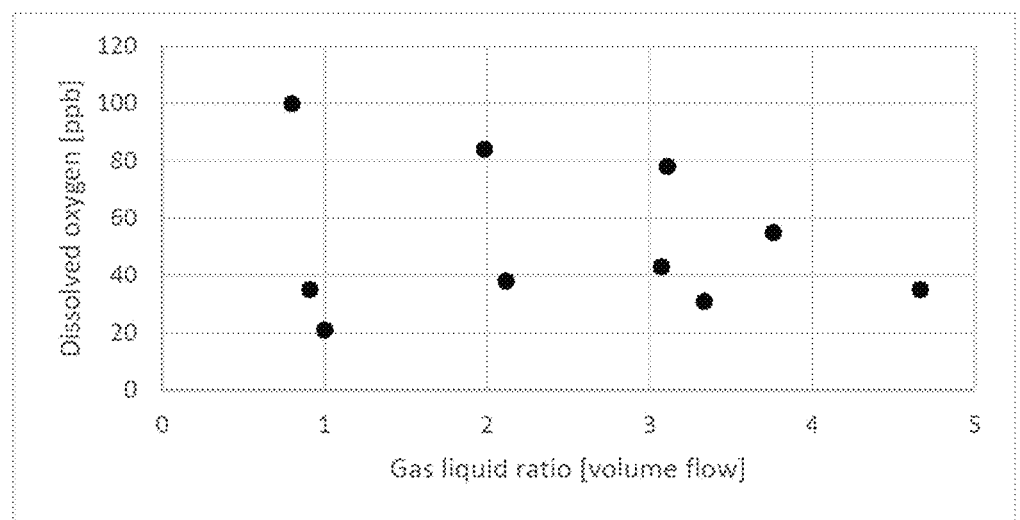
FIG. 11 is another plot of oxygen level in deoxygenated drilling fluid as a function of a ratio of a volume flow rate of gas to a volume flow rate of drilling fluid according to an embodiment.

FIG. 11 shows the results of test set-up B, which yielded higher dissolved oxygen content in the drilling fluid at outlet. The higher dissolved oxygen content may be due to flow rates being outside of the target flow rates needed for sufficient oxygen stripping.

Test set-up C was designed to both break down foam sufficiently and allow for full design flow rate. This was achieved by adding a sump directly to the bottom of the column with no restriction between column and sump (see FIG. 8, set-up C). The level is then controlled in a vessel with greater diameter than the column. The sump has a large enough area for foam control, and the critical flow restriction has a large enough ΔP to accommodate design flow rate.

Experiments with test set-up C was conducted with nitrogen purity of 99.999% and half packing height. Operating the column at design point (500-900 l/min) it was initially achieved extremely good deoxygenation results. 1-3 ppb at outlet. (tests #28, 29). These results again prove the potential for efficient mass transfer. However, it is believed that these results are a combination of good mass transfer efficiency and lower inlet oxygen concentration than expected. The conditions of the inlet drilling fluid for these two tests were that the fluid had been resting. The fluid was splashed against the inner wall of the feed tank when transported from the deoxygenated tank. It is believed that the inlet conditions were free from any free gas due to the resting period, but that it was not saturated with oxygen. Tests 30-37 were conducted with recirculated mud from within the same day and probably contained a large concentration of oxygen at the inlet conditions which caused problem for operating the column, thus, results from these points are not shown.

FIGS. 12A-12C show a set of tests using PERFFLOW™ drilling fluid and 99.99% pure nitrogen gas. A mixer is formed from poly-carbonate pipes having a combined length of more than 4 meters. The structured packing occupies about 2-3.6 meters of length of poly-carbonate pipes, depending on a test that was conducting. For different tests shown in Table 1 of FIG. 12A, the nitrogen gas was flown from a bottom portion of the mixer at a volume flow rates ranging from 1-2.25 Nm$^3$/h (as shown in column 3 of Table 1), while the drilling fluid was flown from a top of the mixer at lower volume flow rates ranging from 0.5-1 m$^3$/h.

FIG. 12B depicts Table 2 that shows the deoxygenation results for test cases 1-27. Column 2 of Table 2 shows the nitrogen gas purity, column 3 shows gas volume flow rate measured in Nm/h, column 4 shows drilling fluid volume flow rate measured in liters per hour (l/h), column 5 measures the pressure of the gas at the gas inlet in units of barg (barg are units of gauge pressure relative to atmospheric pressure), column 6 shows the temperature of the drilling fluid (mud) at the drilling fluid inlet, column 7 shows a concentration of oxygen in the deoxygenated drilling fluid, column 8 shows a concentration of oxygen in the drilling fluid before it has been deoxygenated, and column 9 show a ratio of the gas volume flow rate to the drilling fluid volume flow rate rounded to a nearest integer. For all of the conducted tests 1-27, the level of reduction of oxygen in the drilling fluid is at least tenfold, indicating the effectiveness of the proposed approach of using the gas to remove oxygen from the drilling fluid. FIG. 12C depicts Table 3 that has the same columns as Table 2 but shows test cases 30-36. For test cases 30, 32-36, the volume flow rates of the drilling fluid (as shown in column 5) are higher than volume flow rates of the gas, thus, resulting in generally higher concentrations of oxygen in the deoxygenated drilling fluid, as shown in column 8, than concentrations of oxygen observed for test cases 1-27, as shown in Table 2.

Figure 13:
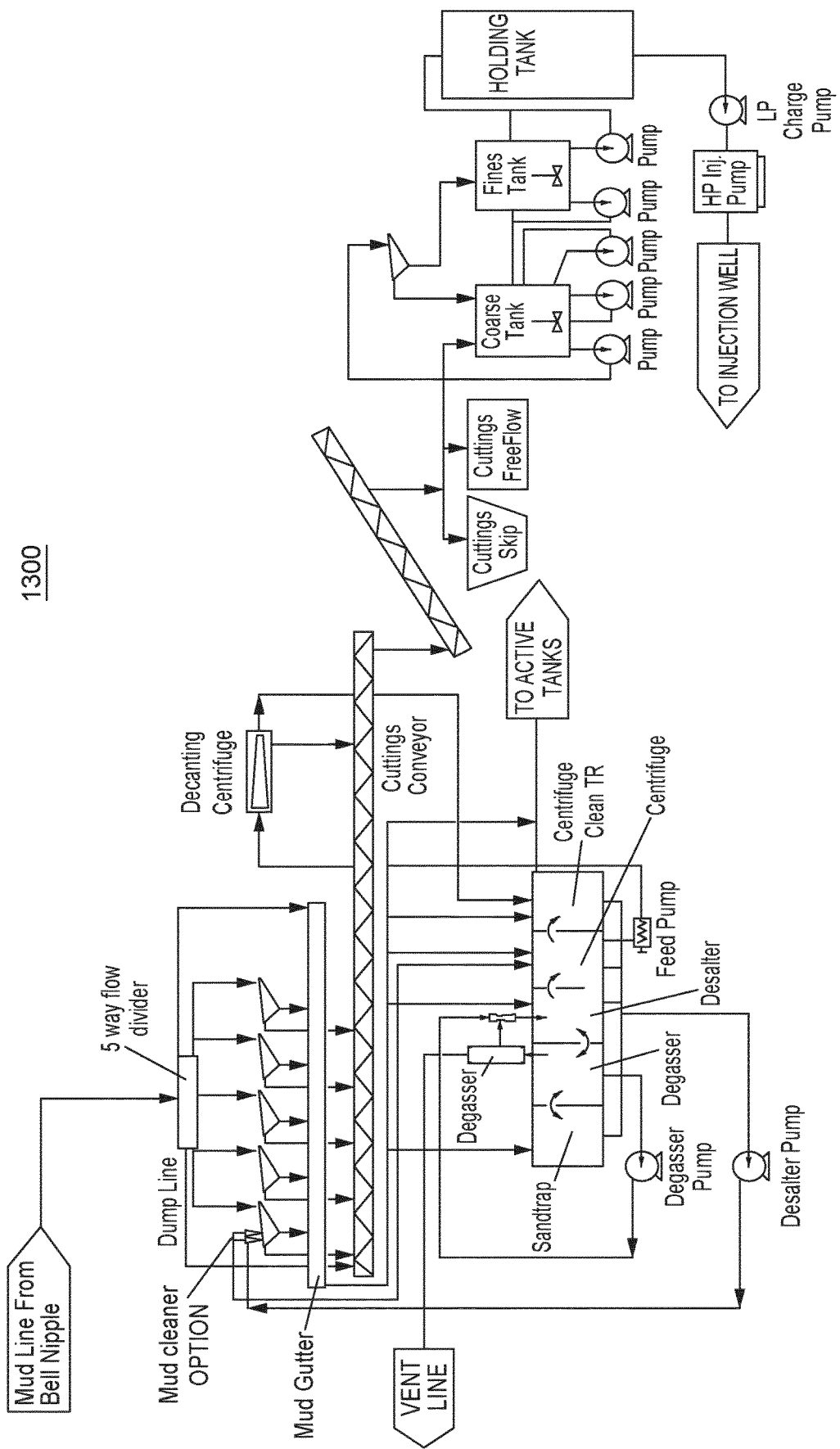
FIG. 13 is an example mud system for a drill rig. according to an embodiment.

FIG. 13 shows an example mud system 1300 that incorporates existing mud tanks, pumps, valves, and pipes. For example, mud system 1300 is configured to degas and desalt the mud, and further remove sand from the mud. Further, mud system 1300 is configured to remove cuttings and other contaminants from the mud. After the mud is cleaned, the mud is placed in a holding tank. In an example embodiment, the oxygen removal system (e.g., system 100) is configured to obtain the mud from the holding tank, deoxygenate the mud, and store it in a second holding tank for storing deoxygenated mud. Thus, the oxygen removal system can be an additional block of mud system 1300 and is configured to fit as a part of mud system 1300.

What is claimed is:

1. A method of removing oxygen from a drilling fluid, the method comprising:
    pumping the drilling fluid into a first inlet of a mixer, the drilling fluid flowing into the mixer from the first inlet in a first direction;
    pumping a gas including nitrogen into a second inlet of the mixer to mix the gas with the drilling fluid, the gas flowing into the mixer from the second inlet in a second direction substantially opposite from the first direction, thereby permitting mass transfer of the oxygen from the drilling fluid to the gas to produce a deoxygenated drilling fluid; and
    discharging the deoxygenated drilling fluid from an outlet of the mixer.

2. The method of claim 1, further comprising collecting the deoxygenated drilling fluid discharged from the outlet of the mixer in a container.

3. The method of claim 1, wherein the mixer includes a portion with structured packing configured to increase a surface area of the drilling fluid.

4. The method of claim 3, wherein the portion with structured packing has a length of at least about two meters.

5. The method of claim 3, wherein the portion with structured packing has a length of at least about five meters.

6. The method of claim 1, wherein the mixer is a column.

7. The method of claim 1, wherein pumping the drilling fluid includes using a centrifugal pump.

8. The method of claim 1, further comprising regulating a flow rate of the drilling fluid before the drilling fluid enters the first inlet.

9. The method of claim 8, wherein the flow rate of the drilling fluid is about 40 m$^3$/h to about 3.400 m$^3$/h.

10. The method of claim 1, further comprising regulating a pressure of the gas before the gas enters the second inlet.

11. The method of claim 1, further comprising regulating a flow rate of the gas before the gas enters the second inlet.

12. The method of claim 11, wherein the flow rate of the gas is about 50 Nm$^3$/h to about 500 Nm$^3$/h.

13. The method of claim 1, further comprising heating the gas to be greater than about 20° C., thereby improving mass transfer efficiency.

14. The method of claim 1, further comprising measuring an oxygen level in the drilling fluid or the deoxygenated drilling fluid.

15. The method of claim 14, wherein measuring the oxygen level includes using an optical sensor.

16. The method of claim 1, wherein the drilling fluid is drilling mud.

17. The method of claim 1, wherein the gas includes at least 99% nitrogen by volume.

18. The method of claim 1, wherein the method removes at least about 90% oxygen from the drilling fluid.

19. The method of claim 1, wherein the method removes at least about 95% oxygen from the drilling fluid.

20. The method of claim 1, wherein the deoxygenated drilling fluid includes less than about 20 parts per billion (ppb) oxygen.

21. A method of decreasing corrosion on a drilling equipment, the method comprising:
    pumping a drilling fluid into a first inlet of a mixer, the drilling fluid flowing into the mixer from the first inlet in a first direction;
    pumping a gas including nitrogen into a second inlet of the mixer to mix the gas with the drilling fluid, the gas flowing into the mixer from the second inlet in a second direction substantially opposite from the first direction, thereby permitting mass transfer of the oxygen from the drilling fluid to the gas to produce a deoxygenated drilling fluid;
    discharging the deoxygenated drilling fluid from an outlet of the mixer; and
    contacting the deoxygenated drilling fluid with the drilling equipment during drilling operation.

22. The method of claim 21, wherein the drilling equipment is a drill string, a riser, or a blowout preventer.

23. A method of decreasing corrosion on a drilling equipment, the method comprising
    contacting a deoxygenated drilling fluid with the drilling equipment during drilling operation, wherein the deoxygenated drilling fluid is produced by:
    pumping a drilling fluid into a first inlet of a mixer, the drilling fluid flowing in a first direction; and
    pumping a gas including nitrogen into a second inlet of the mixer to mix the gas with the drilling fluid, the second inlet being downstream of the drilling fluid, the gas flowing in an opposite direction from the first direction, thereby permitting mass transfer of the oxygen from the drilling fluid to the gas to produce the deoxygenated drilling fluid.

24. The method of claim 23, wherein the drilling equipment is a drill string, a riser, or a blowout preventer.

25. The method of claim 23, wherein:
    the drilling fluid is pumped at a first volume flow rate;
    the gas is pumped at a second volume flow rate; and
    a ratio of the second to the first volume flow rate is at least one.

26. The method of claim 25, wherein the ratio of the second to the first volume flow rate is greater than two.

27. The method of claim 23, wherein:
    the drilling fluid is pumped at a first volume flow rate;
    the gas is pumped at a second volume flow rate; and
    a ratio of the second to the first volume flow rate is selected such that the deoxygenated drilling fluid has an oxygen level below a target threshold.

* * * * *